(12) United States Patent
Zhang et al.

(10) Patent No.: US 9,652,071 B2
(45) Date of Patent: May 16, 2017

(54) METHOD AND APPARATUS FOR HANDWRITING INPUT

(71) Applicant: BOE TECHNOLOGY GROUP CO., LTD., Beijing (CN)

(72) Inventors: Zhuo Zhang, Beijing (CN); Shan Chang, Beijing (CN); Wei Deng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 410 days.

(21) Appl. No.: 14/356,805

(22) PCT Filed: Aug. 22, 2013

(86) PCT No.: PCT/CN2013/082092
§ 371 (c)(1),
(2) Date: May 7, 2014

(87) PCT Pub. No.: WO2014/183351
PCT Pub. Date: Nov. 20, 2014

(65) Prior Publication Data
US 2015/0234524 A1 Aug. 20, 2015

(30) Foreign Application Priority Data

May 14, 2013 (CN) .......................... 2013 1 0177999

(51) Int. Cl.
*G06F 3/041* (2006.01)
*G06F 3/01* (2006.01)
*G06F 3/0488* (2013.01)

(52) U.S. Cl.
CPC ............ *G06F 3/0416* (2013.01); *G06F 3/016* (2013.01); *G06F 3/0414* (2013.01); *G06F 3/04883* (2013.01); *G06F 2203/04101* (2013.01)

(58) Field of Classification Search
CPC ...... G06F 3/0416; G06F 3/016; G06F 3/0414; G06F 3/04883
See application file for complete search history.

(56) References Cited

U.S. PATENT DOCUMENTS 8,606,331 B2 12/2013 Yue
2002/0057260 A1* 5/2002 Mathews ............ G06F 3/03545
345/173
(Continued)

FOREIGN PATENT DOCUMENTS

CN 101697107 A 4/2010
CN 102439556 A 5/2012
(Continued)

OTHER PUBLICATIONS

Chinese Office Action of Chinese Application No. 201310177999.2, mailed Jun. 25, 2015 with English translation.
(Continued)

*Primary Examiner* — Kevin M Nguyen
(74) *Attorney, Agent, or Firm* — Collard & Roe, P.C.

(57) ABSTRACT

The present disclosure relates to the field of a human-machine interaction, and provides a method and apparatus for handwriting input which enable the user to perform the handwriting input more freely in the position, and thus enhance the user experience. The handwriting input method comprises the steps of: detecting the input action of the user who is performing the suspending handwriting input with the handwriting input apparatus; converting the input action to input information; and transmitting the input information via communication to the display device for receiving and displaying the input information. The embodiments of the present disclosure can be applied to the technique of handwriting input in a long distance.

18 Claims, 4 Drawing Sheets

(56) References Cited

U.S. PATENT DOCUMENTS

| | | | | |
|---|---|---|---|---|
| 2006/0214926 | A1* | 9/2006 | Kolmykov-Zotov | G06F 3/04842 345/179 |
| 2009/0267905 | A1* | 10/2009 | Hsu ....................... | G06F 3/044 345/173 |
| 2012/0092294 | A1 | 4/2012 | Ganapathi et al. | |
| 2012/0127088 | A1* | 5/2012 | Pance .................... | G06F 3/016 345/173 |
| 2012/0169726 | A1* | 7/2012 | Flament ................ | G06K 9/222 345/419 |
| 2013/0328810 | A1* | 12/2013 | Li .......................... | G06F 3/043 345/173 |
| 2014/0118253 | A1 | 5/2014 | Jeong | |

FOREIGN PATENT DOCUMENTS

| | | |
|---|---|---|
| CN | 103257727 A | 8/2013 |
| CN | 103793074 A | 5/2014 |

OTHER PUBLICATIONS

English translation of the International Preliminary Report on Patentability and Written Opinion of the International Searching Authority of PCT/CN2013/082092, issued Nov. 17, 2015.

Notification to Grant the Patent Right (Notice of Allowance) for Chinese Application No. 201310177999.2 issued Feb. 5, 2016 in Chinese with an English translation.

Issued Patent for Chinese Application No. 201310177999.2 (CN 103257727 B) which was granted on Mar. 23, 2016 in Chinese with the Chinese granted claims with an English translation.

English Translation of the International Search Report of PCT/CN2013/082092 published in English on Nov. 20, 2014.

International Search Report, International Preliminary Report on Patentability and Written Opinion of the International Searching Authority of PCT/082092 in Chinese, mailed Feb. 20, 2014.

\* cited by examiner

METHOD AND APPARATUS FOR HANDWRITING INPUT

CROSS REFERENCE TO RELATED APPLICATIONS

This application is the National Stage of PCT/CN2013/082092 filed on Aug. 22, 2014, which claims priority under 35 U.S.C. §119 of Chinese Application No. 201310177999.2 filed on May 14, 2013, the disclosure of which is incorporated by reference. The international application under PCT article 21(2) was not published in English.

TECHNICAL FIELD

The present disclosure relates to the art of human-machine interaction, particularly to a method and apparatus for handwriting input.

BACKGROUND

In recent years, handwriting input is mostly used for a supplement to or a replacement for the conventional keyboard input in electronics devices, since there exist requirements in the follow cases: it is required to cancel the keyboard in order to reduce the volume of the device; it is difficult for special users to use keyboard (e.g. users who have difficulty in typing); and it is required that an accurate input is performed sometimes (e.g., painting, precise drawing), and the like.

As known, the handwriting input is achieved in such a way that a handwriting pen and a tablet (or display screen with handwriting function) are combined. In particular, it is needed to realize the input by writing on a tablet with a corresponding handwriting pen.

However, as known, it is necessary for the user to touch the tablet with the handwriting pen when the user wants to fulfill the handwriting input so as to ensure the completion of the handwriting input, which causes the user to be confined in space when performing the handwriting input thereby giving rise to poor user experience.

SUMMARY

There provide in the embodiments of the present disclosure a method and apparatus for handwriting input which enables the user to perform the handwriting input more freely in the position, and thus enhance the user experience.

According to a first aspect of the present disclosure, there is provided a handwriting input apparatus comprising:

an input action detection unit configured to detect an input action of an user who is performing a suspending handwriting input with the handwriting input apparatus;

a processing unit connected to the input action detection unit and configured to convert the input action to input information; and a communication unit connected to the processing unit and configured to transmit the input information via communication to a display device for receiving and displaying the input information.

Optionally, the input action detection unit can comprise:

a pressure detection module configured to detect a press parameter that is generated by pressing the handwriting input apparatus when the user performs the suspending handwriting input;

an action determination module connected to the pressure detection module and configured to determine the input action of the user as an active motion when the press parameter is greater than or equal to a preset threshold value, and to determine the input action of the user as a shift motion when the press parameter is less than the preset threshold value.

Optionally, the action determination module is further configured, when the user performs the suspending handwriting input with the handwriting input apparatus, to determine the input action of the user as an inactive motion, if coordinates of a cursor on a display screen of the display device corresponding to the input action go beyond a display range of the display device, or if the handwriting input apparatus uses the display screen of the display device as a handwriting input plane for the suspending handwriting input, and the angle formed by the plane and a normal line of the display screen of the display device is greater than a preset angle.

Optionally, when the handwriting input apparatus uses the display screen of the display device as the handwriting input plane for the suspending handwriting input, and the input action detection unit detects that the input action of the user who is performing the suspending handwriting input with the handwriting input apparatus is a click operation, the processing unit converts the click operation into the input information for "one dot"; the communication unit transmits the information for "one dot" to the display device via communication, so that a position corresponding to the input information on the display screen of the display device is clicked.

Optionally, the handwriting apparatus further comprises an action switching unit connected to the processing unit and configured to switch a motion state and/or an operation type of the handwriting input apparatus.

Optionally, the handwriting input apparatus further comprises an input state switching unit connected to the processing unit and configured to switch an input state of the handwriting input apparatus when the handwriting input apparatus is in an active motion state.

Optionally, the handwriting input apparatus further comprises a reset unit connected to the communication unit and configured to reset the cursor on the display screen of the display device.

Optionally, when the press parameter is pressure, the preset threshold value is 0.5 Newton, and in a case where the press parameter is intensity of pressure, the preset threshold value is 1000 Pascal.

Optionally, the handwriting input apparatus further comprises a force feedback unit connected to the communication unit and configured to feed a force back to the user when the communication unit receives feedback information from the display device.

According to a second aspect of the present disclosure, there is provided a handwriting pen comprising a casing in which the handwriting input apparatus as described above is arranged.

Optionally, a concave region is arranged in the casing, and the pressure detection module is located in the concave region.

According to a third aspect of the present disclosure, there is provided a handwriting input method comprising steps of:

detecting an input action of the user who is performing the suspending handwriting input with the handwriting input apparatus;

converting the input action to input information; and transmitting the input information via communication to a display device for receiving and displaying the input information.

Optionally, the step of detecting an input action of the user who is performing the suspending handwriting input with the handwriting input apparatus comprises:

detecting a press parameter that is generated by pressing the handwriting input apparatus when the user performs the suspending handwriting input;

determining the input action as an active motion when the press parameter is greater than or equal to a preset threshold value; and determining the input action as a shift motion when the press parameter is less than the preset threshold value.

Optionally, the active motion comprises an action for drawing a line, an action for erasing a line, a clicking action, and a pulling action.

Optionally, the step of detecting the input action of the user who is performing the suspending handwriting input with the handwriting input apparatus further comprises: determining the input action of the user as an inactive motion if coordinates of a cursor on the display screen of the display device corresponding to the input action go beyond a display range of the display device, or if the handwriting input apparatus uses the display screen of the display device as a handwriting input plane for the suspending handwriting input, and the angle formed by the plane and a normal line of the display screen of the display device is greater than a preset angle.

Optionally, when the handwriting input apparatus uses the display screen of the display device as a handwriting input plane for the suspending handwriting input, and in the step of detecting the input action of the user who is performing the suspending handwriting input with the handwriting input apparatus, the input action of the user who is performing the suspending handwriting input with the handwriting input apparatus is detected as a click operation, the step of converting the input action into input information is as follows: converting the click operation into the input information for "one dot";

the step of transmitting the input information via communication to the display device for receiving and displaying the input information can be as follows: transmitting the input information for "one dot" to the display device via communication, so that a position on the display screen of the display device corresponding to the input information is clicked.

Optionally, the method further comprises any one or any combination of the following steps:

switching a motion state and/or an operational type of the handwriting input apparatus;

switching the input state of the handwriting input apparatus when the handwriting input apparatus is in an active motion state;

resetting the cursor on the display screen of the display device; and feeding a force back to the user when feedback information from the display device is received.

Optionally, when the press parameter is pressure, the preset threshold value is 0.5 N, and when the press parameter is intensity of pressure, the preset threshold value is 1000 P.

In the method and apparatus for handwriting input according to the embodiments of the present disclosure, the input action of the user who is performing the suspending handwriting input with the handwriting input apparatus is detected and then converted to the input information, and finally the information is transmitted to the display device via communication. The use of communication enables that the input distance of the handwriting input apparatus is longer, and the handwriting input apparatus is no longer limited to a contact input mode as the previous handwriting input apparatus does such that the handwriting input can be realized in a long distance when the user performs the suspending handwriting input with the handwriting input apparatus. Therefore, the user is enabled to perform the handwriting input more freely in the position, since it is unnecessary for the user to make the handwriting pen contacted certainly with the tablet as usual, thereby enhancing the user experience.

DETAILED DESCRIPTION OF THE PREFERRED EMBODIMENTS

Clear and complete descriptions will be given to the technical solutions of the embodiments of the present disclosure in connection with the appended drawings. Obviously, the embodiments as described are only a part of the embodiments of the present disclosure, not all of the embodiments of the present disclosure. All other embodiments obtained by those skilled in the art from the disclosure without paying any inventive labor belong to the protection scope of the invention.

The embodiments of the disclosure provide a method and apparatus for handwriting input, wherein when the user performs a suspending handwriting input with the handwriting input apparatus, an input action of the user is detected and then converted to input information, and finally the information is transmitted to the display device via communication. The use of communication enables that the input distance for the handwriting input apparatus is longer, and the handwriting input apparatus is no longer confined to a contact input mode as the conventional handwriting input apparatus, such that the handwriting input can be realized in a long distance when the user performs the suspending handwriting input with the handwriting input apparatus. The embodiments of the disclosure can enable the user to perform the handwriting input more freely in the position, since it is unnecessary for the user to make the handwriting pen contact the tablet as usual, thereby enhancing the user experience.

Hereinafter, detailed descriptions will be given to the handwriting input apparatus according to the embodiment of the disclosure by means of the particular embodiments of the present disclosure.

Figure 1:
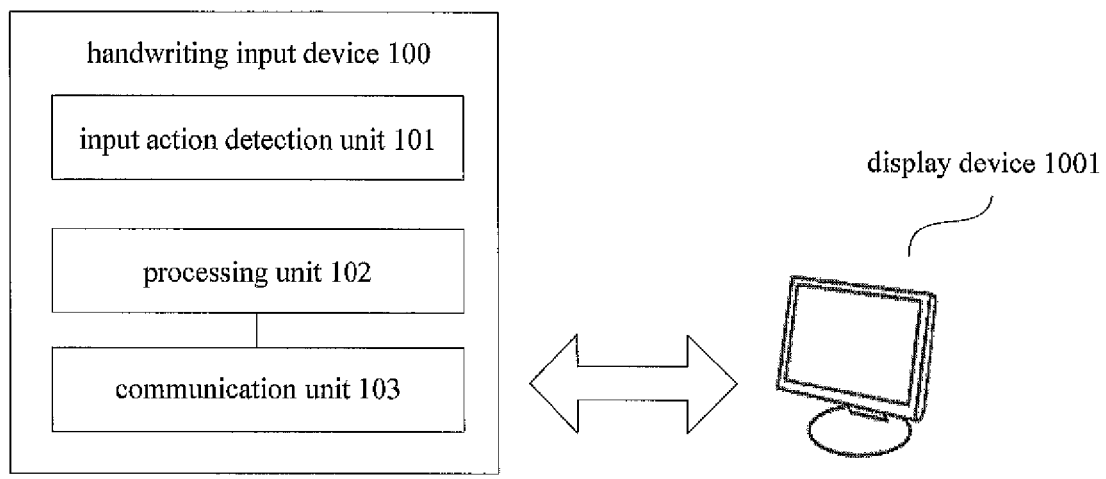
FIG. 1 is a schematic block diagram of a structure of a handwriting input apparatus according to an embodiment of the present disclosure.

FIG. 1 shows a block diagram of a structure of a handwriting input apparatus according to an embodiment of the disclosure. As shown in FIG. 1, the handwriting input apparatus 100 of the embodiment comprises:

an input action detection unit 101 configured to detect an input action of the user who is performing a suspending handwriting input with the handwriting input apparatus 100. Herein the suspending handwriting input refers to an input performed by the user in such a state that there is a distance between the handwriting input apparatus 100 and the screen of the display device 1001 (not shown in FIG. 1), and in this situation, it is unnecessary for the user to maintain the handwriting input apparatus 100 to touch the display device 1001. Specifically, by means of the suspending handwriting input, for example, line inputting of characters, graphics and the like, clicking of icons displayed on the screen, erasing of the existing lines, or pulling of pictures displayed on the screen, or the like can be performed on the screen of the display device 1001, and the embodiments of the disclosure are not limited thereto.

When the user picks up the handwriting input apparatus 100 to perform the suspending handwriting input on the display device 1001, the input action detection unit 101 detects the input action at this time.

In a specific application, for example, a gravity sensor, a position sensor, a dynamic sensing system (comprising an accelerometer and a gyroscope) or a combination of the above can be employed as the input action detection unit 101. The embodiments of the disclosure are not limited thereto, and those skilled in the art can select any appropriate devices as desired.

Figure 2:
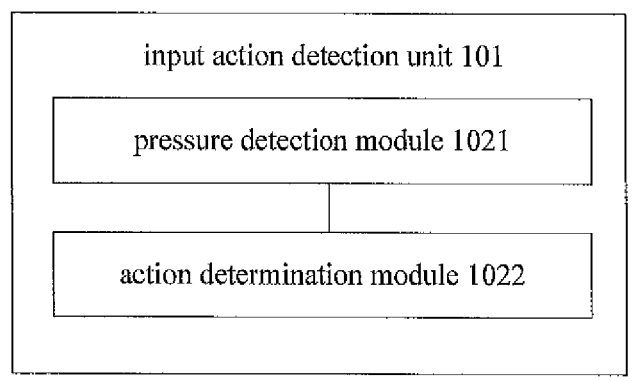
FIG. 2 is a schematic block diagram of a structure of a processing unit in the handwriting input apparatus shown in FIG. 1.

Specifically, as shown in FIG. 2, the input action detection unit 101 in an embodiment of the disclosure can comprise:

a pressure detection module 1021 configured to detect a press parameter generated when the user presses the handwriting input apparatus 100 in the suspending handwriting input;

an action determination module 1022 connected to the pressure detection module 1021, configured to determine the input action of the user as an active motion when the press parameter is greater than or equal to a preset threshold value, and to determine the input action of the user as a shift motion when the press parameter is less than the preset threshold value; where the press parameter can be a pressure force or a pressure intensity.

The active motion refers to a motion that the user performs an active input action. In a specific application, it can comprise for example, an action for drawing a line, an action for erasing a line, a clicking action, and a pulling action. Herein, the action for drawing the line comprises writing characters, graphics and the like; the action for erasing the line refers to erasing the existing lines (characters, graphics and the like); the clicking action comprises clicking and selecting, double clicking and starting-up displayed applications; the pulling action comprises pulling of the application, the pictures displayed on the screen, and the like.

The shift motion refers to a motion that the user only shifts a position without performing any input, which mainly comprises the moving of a cursor on a display screen.

It can be appreciated that the operation performed by the action determination module 1022 to determine a type of the input action by comparing the press parameter with the preset threshold value is only an example of the present disclosure, and the embodiment of the present disclosure is not limited thereto. For example, the press data of a plurality of users can be collected in advance, and the collected press data is stored as the preset threshold value for use. In this case, by comparing the press parameter as detected by the pressure detection module 1021 with the preset threshold value, the type of the input action can be determined accurately using the individualized press data as collected for different users; the embodiments of the present disclosure are not limited thereto, and those skilled in the art can select any appropriate manners freely.

Specifically, in an embodiment of the disclosure, when the press parameter is pressure, the preset threshold value is 0.5 Newton, and when the press parameter is intensity of pressure, the preset threshold value is 1000 Pascal. It should be noted that the preset threshold value can be set as any value previously by those skilled in the art according to the actual situations, and the embodiments of the present disclosure are not limited thereto.

Figure 3:
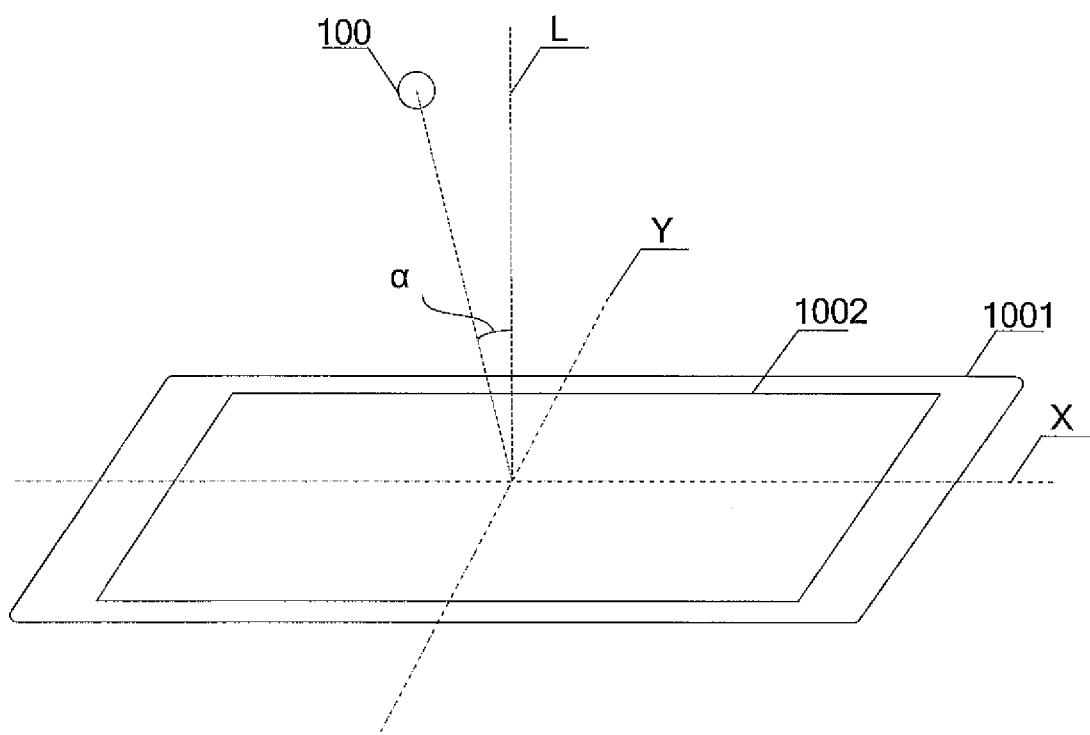
FIG. 3 is a schematic diagram of an angle formed by a handwriting input apparatus and a normal line of a display screen of a display device.

Optionally, in an embodiment of the invention, when the user performs a suspending handwriting input with the handwriting input apparatus 100, the action determination module 1022 is further configured, as shown in FIG. 3, to determine that the input action of the user is an inactive motion, if the coordinates of the cursor on the display screen 1002 of the display device 1001 corresponding to the input action go beyond the display range of the display device 1001, or if the handwriting input apparatus 100 uses the display screen 1002 of the display device 1001 as a handwriting input plane for the suspending handwriting input, and the angle formed by the plane and the normal line of the display screen 1002 of the display device 1001 is greater than a preset angle (for example, 45°).

It should be noted that the cursor on the display screen 1002 is used to prompt the user of an initial position for an operation corresponding to the input action on the display screen 1002, and the shape of the cursor can be an arrow, a round spot, a triangle, a pencil-shape, a hand-shape, or the like. For instance, the cursor is displayed with a pencil-shape in a writing state, and is displayed with a hand-shape in the pull state; the embodiments of the invention are not limited thereto, and those skilled in the art can select any appropriate shapes. The coordinates of the cursor, that is, the data reflecting the position of the cursor, are used for the display device 1001 to determine the position of the cursor. Further, the display range refers to the displayable area of the display screen 1002, and the display device 1001 does not perform a display when it determines that the position of the cursor goes beyond the display range based on the coordinates of the cursor.

Herein, the inactive motion refers to a meaningless operation performed by the user. For example, in the case that it is determined that a line inputted by the user has gone beyond the displayable range of the display device 1001, the end point of the cursor is located outside the display range of the display device 1001 at this time; in view of this, the action determination module 1022 determines that it cannot be displayed and considers such an operation as a meaningless or unconscious operation of the user, and at this time, the input action of the user is determined as an inactive motion.

In addition, another determination mode of the inactive motion is the determination for the angle. As shown in FIG. 3, the normal line of the display screen 1002 refers to an imaginary line L being vertical to the center of the display screen 1002. Specifically, the imaginary line L is vertical to the intersection of a central line in a lateral direction X and a central line in a longitudinal direction Y of the display screen 1002 of the display device 1001 and is located above the center of the display screen 1002. In such a case, the above angle is an angle α between the handwriting input apparatus 100 and the normal line L. At this time, if the angle α formed between the handwriting input apparatus 100 and the normal line L of the display screen 1002 of the display device 1001 is greater than a preset angle (for example, 45°), the input action of the user is also determined as an inactive motion.

Again referring back to FIG. 1, as shown in FIG. 1, the handwriting input apparatus 100 further comprises a processing unit 102 connected to the input action detection unit 101 and configured to convert the input action to input information.

Specifically, after the input action detection unit 101 determines the type of the input action of the user, the processing unit 102 converts the input action to the input information. For instance, if the type of input action is to an active motion, the input action is converted to the data corresponding to the input action of the user; for example, if the input action of the user is a linear action, it is converted to the linear data information, so that the display device 1001 can make a response to the input action, such as displaying and the like, by using the linear data information; if the input action is an inactive motion, it is converted to inactive information directly, and in this case, the display device 1001 makes no response to the input action, until the input action is determined as an active action.

The handwriting apparatus 100 further comprises: a communication unit 103 connected to the processing unit 102 and configured to transmit the input information via communication to the display device 1001 for receiving and displaying the input information.

Herein, the communication can be a wireless communication or a wire communication, as long as the input information can be transmitted to the display device 100. For example, the wireless communication can be realized within the range covered by the wireless communication, and in the wire communication, a long distance communication can be achieved by prolonging the transmission line. In this regard, those skilled in the art can select freely, and the embodiments of the present disclosure are not limited thereto.

It can be seen from the above that, in the handwriting input apparatus 100 according to the embodiment of the disclosure, the input action of the user who is performing the suspending handwriting input with the handwriting input apparatus 100 is detected and then converted to the input information, and finally the information is transmitted to the display device 1001 via communication, The use of communication enables that the input distance for the handwriting input apparatus 100 is longer, and the handwriting input apparatus is no longer confined to the contact input mode as the conventional handwriting input apparatus does, such that the handwriting input can be realized in a long distance when the user performs the suspending handwriting input with the handwriting input apparatus. The embodiments of the disclosure can enable the user to perform the handwriting input more freely in the position, since it is unnecessary for the user to make the handwriting pen contact the tablet as usual, thus improving the user experience.

In an illustrative embodiment of the present disclosure, as shown in FIGS. 1-3, the handwriting input apparatus 100 can also perform a click operation on the display screen 1002 of the display device 1001. In a specific application, when the handwriting input apparatus 100 uses the display screen 1002 of the display device 1001 as a handwriting input plane for the suspending handwriting input, and the input action detection unit 101 detects that the input action of the user performing the suspending handwriting input with the handwriting input apparatus 100 is a click operation, the processing unit 102 converts the click operation into the input information for "one dot"; the communication unit 103 transmits the input information for "one dot" to the display device 1001 via communication, so that the position corresponding to the input information on the display screen 1002 of the display device 1001 is clicked.

Specifically, if the user uses the handwriting input apparatus 100 to click an application displayed on the display screen 1002 in order to select or open the application, the input information converted from the clicking action is the information on a trace of "one dot".

Figure 4A:
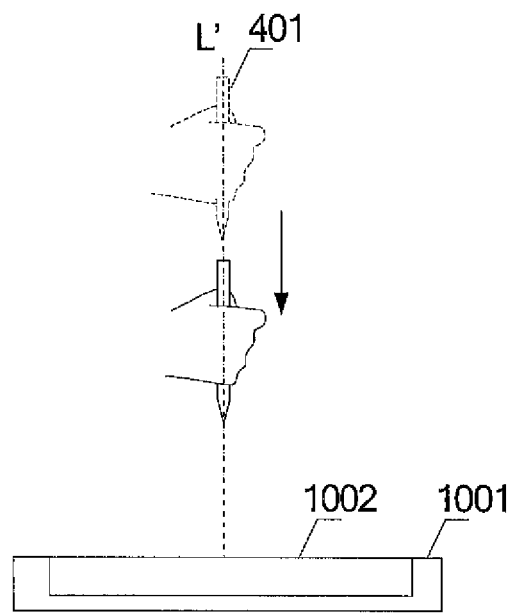
FIGS. 4(a) and (b) are schematic diagrams showing a state in which an input action of the user is a click operation.
Figure 4B:
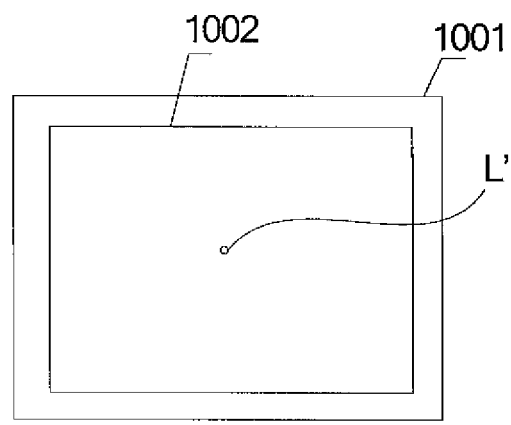

Next, further descriptions are given with reference to FIG. 4(a) and FIG. 4(b). FIG. 4(a) and FIG. 4(b) show a state in which the input action of the user is a click operation. Specifically, FIG. 4(a) and FIG. 4(b) show the case where the handwriting input apparatus 100 is mounted in a pen 401 is taken as an example for illustration. In such a case, an imaginary line of the input trace formed by the click performed by the user on the application displayed on the display screen 1002 is a straight line perpendicular to the plane where the display screen 1002 is located, i.e. the imaginary line shown as L' in FIGS. 4(a) and 4(b). Accordingly, a corresponding trace on the display screen 1002 of the display device 1001 is an intersection point of the line L' and the display screen 1002, and the intersection point represents the input information for "one-dot". Thus, the information transmission from the handwriting input apparatus 100 to the display device 1001 is completed. At this time, the position corresponding to the input information on the display device 1001 is clicked.

Of course, the examples shown in FIG. 4(a) and FIG. (4b) are only used for facilitating the understanding the embodiments of the present disclosure; herein, the input information on "one-dot" converted by the processing unit 102 is not limited to the definition of "one-dot" in the sense of geometry, and it comprises fussy recognition of a shape similar to a similar dot. For instance, a threshold value of a size, shape and length of "one-dot" can be preset, and in such a case, the input trace can be considered as "one-dot" as long as it does not exceed the threshold value, so that the input action is determined as the click operation; and further, the recognition of the "one-dot" is realized. Of course, the embodiments of the present disclosure are not limited thereto.

In the handwriting input apparatus 100 in the above embodiment of the disclosure, for the user, a plurality of functions (writing, clicking and the like) can be implemented simply in a long distance since the case where the input information converted from the click operation is "one-dot" is considered thereby the user experience is enhanced.

Further, in an illustrative embodiment of the present disclosure, the handwriting apparatus 100 can further comprise an action switch unit connected to the processing unit 102 and configured to switch a motion state and/or an operational type of the handwriting input apparatus 100. In a specific application, the action switch unit can be set to be an action switch key.

Herein, the switching of the action switch unit in the motion states can be cooperated with the determination of the action determination module 1022 in the motion states. For instance, different priorities are set for the switching of the action switch unit and the determination of the action determination module 1022. For example, in a case where the action switch unit has a higher priority, if the action switch unit is switched to an inactive motion, the input at this time is considered as an inactive motion regardless of the result of the determination of the action determination module 1022; on the contrary, in a case where the action switch key has a lower priority in switching, if the action switch key is switched to an inactive motion but the result of the determination of the action determination module 1022 is the active motion, the input at this time is considered as an active motion regardless of the switching of the action switch key. In the above handwriting input apparatus 100 according to the embodiment of the disclosure, due to the further addition of the action switch key, it is more convenient for the user to use the action switch key to select the motion state, so that the user's input is easier and thus enhancing the use experience.

In addition, in an illustrative embodiment of the present disclosure, the handwriting input apparatus 100 further comprises an input state switch unit connected to the processing unit 102 and configured to switch the input state of the handwriting input apparatus 100 when the handwriting input apparatus 100 is in the active motion state. In a specific application, the input state switch unit can be an input state switch key.

In a specific application, when the action switch unit is set in a position of an active motion, the input state switch unit can further subdivide the active motion into a writing action, an erasing action, a clicking action and a pulling action. Herein, in the writing state, the user can for example, write characters, draw a graph and the like; in the erasing state, the user can for example, erase the existing characters, the graph and the like; in the clicking state, the user can for example, click and choose, or click and start the application, file folder and the like; and in the pulling state, the user can for example, pull the application, picture and the like displayed on the display screen 1002 to change the position thereof. The handwriting input apparatus 100 in the above embodiment of the present disclosure enables the user to switch the operation type simply due to the further addition of the input state switch unit thereby raising the input accuracy.

In another illustrative embodiment of the present disclosure, the handwriting input apparatus 100 can further comprise a reset unit connected to the communication unit 103 and configure to reset the cursor on the display screen 1002 of the display device 1001. In a specific application, the reset unit can be a reset key.

Herein, the reset operation refers to the operation making the cursor return to a preset position, for example, the central position. Naturally, the reset position in the embodiment of the present disclosure is not limited to the central position, for example, the reset position can be arranged on the left of the central position of the display screen 1002 for the left-handed user, and vice versa, i.e., the reset position can be arranged on the right of the central position of the display screen 1002 for the right-handed user. Those skilled in the art can select as required, and the embodiments of the present disclosure are not limited thereto. The handwriting input apparatus 100 of the embodiments of the present disclosure enables the user to find the cursor to complete the handwriting input more quickly due to the further addition of the reset key, thus raising the input efficiency of the handwriting input.

Further, in an illustrative embodiment of the present disclosure, the handwriting input apparatus 100 can further comprise a force feedback unit connected to the communication unit 103 and configured to feed a force back to the user when the communication unit 103 receives the feedback information from the display device 1001.

For instance, when the user performs a click operation on the display device 1001 with the handwriting input apparatus 100, if the content displayed on the display screen 1002 is selected by the click effectively, the force feedback unit vibrates at this time and makes a feedback to the user in time, so that the user perceives the vibration and thus knows that the click operation is active.

Of course, it may be understood that the user can intuitively determine the effectiveness of the click (or other input action) in a visual sense, an auditory sense and the like without setting the force feedback unit, the embodiments of the present disclosure are not limited thereto, and those skilled in the art can select as desired.

Optionally, in an illustrative embodiment of the present disclosure, there is provided a handwriting pen comprising a casing in which the handwriting input apparatus 100 as described above in any of the embodiments is disposed.

Of course, the handwriting input apparatus 100 can be arranged in the input components other than the handwriting pen, for example, handwriting picks, handwriting gloves, a joystick and the like, and the embodiments of the present disclosure are not limited thereto.

Specifically, in an illustrative embodiment of the disclosure, there is arranged on the casing, a concave region in which a pressure detection module 1021 is located.

Herein, the concave region is a part located on the handwriting pen and sunken toward the inner of the handwriting pen, so that the user can hold the handwriting pen conveniently by means of the concave part and apply a force to the pressure detection module 1021 effectively.

Figure 5:
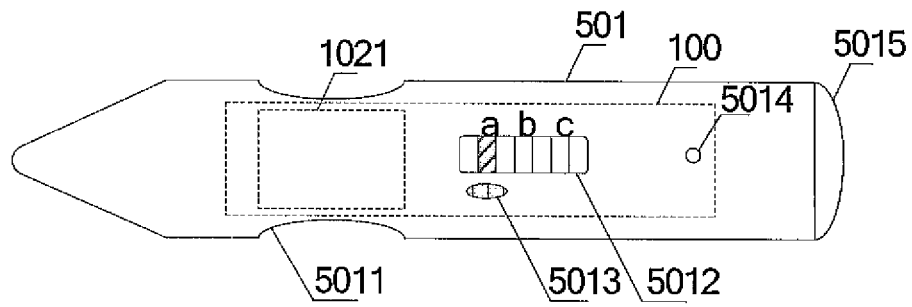
FIG. 5 is a schematic diagram showing a specific example of a handwriting pen according to an embodiment of the invention.

FIG. 5 shows a schematic diagram of a specific example of the handwriting pen of the embodiment of the disclosure. Further descriptions will be given to the handwriting input apparatus 100 and the handwriting pen 501 equipped with the handwriting input apparatus 100 according to the embodiment of the disclosure by a specific embodiment with reference to FIG. 5.

Firstly, a simplified description will be given to the main components of the handwriting pen 501.

The handwriting input apparatus 100 is arranged in the casing of the handwriting pen 501. Further, the casing of the handwriting pen 501 can be divided into three parts, i.e., the head of the handwriting pen, the body of the handwriting pen, and the tail of the handwriting pen. In addition, there is arranged in the body of the handwriting pen, a concave region 5011 for being held by the user in use, and the pressure detection module 1021 of the handwriting input apparatus 100 is arranged in the concave region 5011. Herein, two or three pressure detection modules 1021 can be arranged so as to increase the sensitivity and accuracy of the handwriting pen 501; and the pressure detection module 1021 as shown in FIG. 5 is arranged in the concave region 5011 in order to sense the gripping force of the user more directly. In addition, an opening is arranged on the casing of the handwriting pen 501, and the action switch unit, the input state switch unit, and the reset unit of the handwriting input apparatus 100 are set as an action switch key 5012, an input state switch key 5013 and a reset key 5014 respectively, which protrude outside of the casing respectively from the opening for the user to operate. Herein, a, b, c in FIG. 5 represent the switching positions of an active motion, a shift motion and an inactive motion of the action switch key 5012 respectively. In addition, in the embodiment, a handwriting pen switch 5015 is arranged at the tail of the handwriting pen 501 for switching on or off the handwriting pen 501, and the handwriting pen 501 is active only when it is switched on.

Next, the operation modes of the handwriting pen 501 are described schematically.

In a case where the handwriting pen switch 5015 is switched on, the type of the handwriting input is determined by the action switch key 5012. In the present embodiment, only when the action switch key 5012 is located at the position a, the input state switch key 5013 can be activated; in other words, when the action switch key 5012 is located at the position b or c other than the position a, the input state will not change even if the state switch key 5013 is toggled by the user. Next, the descriptions will be given to a case where the action switch key 5012 is located at the position a representing an active motion with reference to FIG. 5.

At this time, the user can further select the input state currently required by operating the input state switch key 5013; in the present embodiment, the user can select a writing action state, an erasing action state, a clicking action state or a pulling action state by the input state switch key 5013, but for facilitating the understanding and illustration of the present disclosure, only the case where the user selects the writing action state is taken as an example for illustration.

In this example, the user can further determine whether the reset key 5014 needs to be pressed according to the position of the cursor displayed on the display screen. In a case where it is difficult to find the cursor, the user moves the cursor back to the preset position by pressing the reset key 5014.

When the user grips the concave region 5011 with the fingers in order to further complete the input, the pressure detection module 1021 can detect the pressure imposed thereon directly since the state switch key 5013 represents the writing state at this time, the handwriting input apparatus 100 can thus determine that the handwriting input at this time is in the writing state of the active motions when the pressure detected by the pressure detection module 1021 is greater than a preset threshold value. In this case, the user can operate the handwriting input apparatus 100 to input, in the handwriting mode, characters, patterns and the like within the displayable range of the display screen.

It should be noted that the present embodiment is only an exemplified description for facilitating the understanding of the present disclosure, and that those skilled in the art can modify the embodiment freely as desired; for example, the force feedback unit can be further arranged in the concave region 5011 to give more intuitive operating experience to the user, or the posture of the handwriting pen 501 can be further determined by the action determination module so that the activity of the input action can be determined by the aforementioned angle, and the embodiments of the disclosure are not limited thereto.

Figure 6:
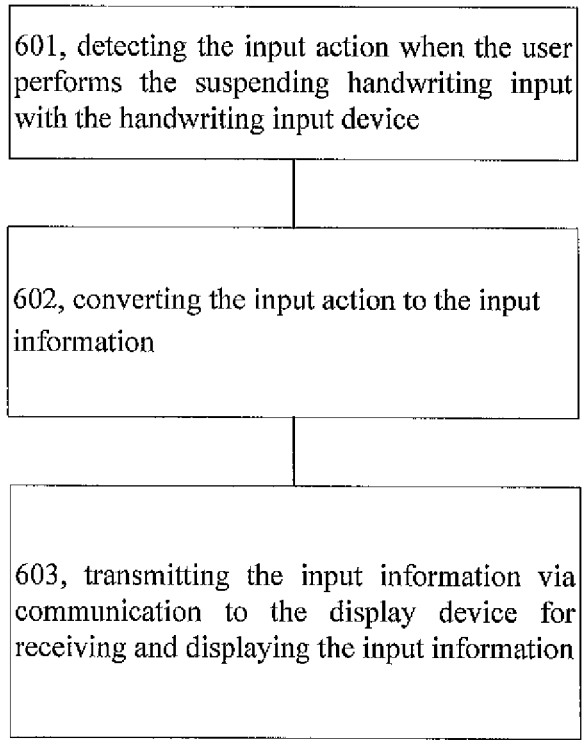
FIG. 6 is a flowchart of a handwriting input method according to an embodiment of the invention.

FIG. 6 shows a flowchart of a handwriting input method according to an embodiment of the present disclosure. Corresponding to the handwriting input apparatus described in the above the embodiment, as shown in FIG. 6, the operational procedures of the handwriting input method according to the present embodiment are as follows:

in step 601, detecting the input action of the user performing the suspending handwriting input with the handwriting input apparatus;

in step 602, converting the input action to input information;

in step 603, transmitting the input information via communication to the display device for receiving and displaying the input information.

Specifically, in an exemplified embodiment of the present disclosure, the step 601 comprises:

detecting a press parameter that is generated by pressing the handwriting input apparatus when the user performs the suspending handwriting input;

determining the input action as an active motion when the press parameter is greater than or equal to a preset threshold value; and determining the input action as a shift motion when the press parameter is less than the preset threshold value.

In a specific application, the active motion comprises an action for drawing a line, an action for erasing a line, a clicking action, and a pulling action;

In an embodiment of the present disclosure, when the press parameter is pressure, the preset threshold value is 0.5 Newton, and when the press parameter is intensity of pressure, the preset threshold value is 1000 Pascal.

In an exemplary embodiment of the invention, the step 601 further comprises: determining the input action of the user as an inactive motion if the coordinates of the cursor on the display screen of the display device corresponding to the input action go beyond the displaying range of the display device, or if the handwriting input apparatus uses the display screen of the display device as a handwriting input plane for the suspending handwriting input and the angle formed by a plane and the normal line of the display screen of the display device is greater than a preset angle.

Further, in an exemplified embodiment of the present disclosure, when the handwriting input apparatus uses the display screen of the display device as a handwriting input plane for the suspending handwriting input, and in the step of detecting an input action that the user performs the suspending handwriting input with the handwriting input apparatus, when the input action of the user performing the suspending handwriting input with the handwriting input apparatus is detected as a click operation, the step of converting the input action into the input information can be particularly as follows: converting the click operation into the input information for "one dot"; the step of transmitting the input information via communication to the display device for receiving and displaying the input information can be particularly as follows: transmitting the input information for "one dot" to the display device via communication, so that the position corresponding to the input information on the display screen of the display device is clicked.

Furthermore, in an exemplary embodiment of the present disclosure, the method further comprises any one or any combination of the following steps:

switching the motion state and/or the operation type of the handwriting input apparatus;

switching the input state of the handwriting input apparatus when the handwriting input apparatus is in an active motion state;

resetting the cursor on the display screen of the display device; and feeding a force back to the user when the feedback information from the display device is received.

The above handwriting input method corresponds to the handwriting input apparatus and the handwriting pen, and will not be repeated here.

In the handwriting input method of the present embodiment, the input action of the user who is performing the suspending handwriting input is detected and then converted to the input information, and finally the information is transmitted to the display device via communication so that a long distance handwriting input can be achieved by the mode of communication, thus enabling the user to perform the handwriting input more freely in the position without making the handwriting pen contacted certainly with the tablet as usual, so as to enhance the user experience.

It should be appreciated that the above embodiments are only illustrative, and in no way limit the scope of the present disclosure. Those skilled in the art may figure out easily various modifications and substitutions without departing from the spirit and scope of the present disclosure. Such modifications and substitutions are intended to be covered by scope of the present disclosure. Therefore, the protection of the present disclosure should be defined by the following claims.

What is claimed is:

1. A handwriting input apparatus comprising:
   an input action detection circuit configured to detect an input action of an user who is performing a suspending handwriting input with the handwriting input apparatus, the suspending handwriting input being configured to perform line inputting and erasing of the existing lines, the line inputting including inputting of characters and graphics;
   a processing circuit connected to the input action detection circuit and configured to convert the input action to input information;
   a communication circuit connected to the processing circuit and configured to transmit the input information via communication to a display device for receiving and displaying the input information; and
   an action switching circuit, wherein the input action is considered as the inactive motion in a case where the action switching circuit has a higher priority and is switched to an inactive motion.

2. The apparatus according to claim 1, wherein the input action detection circuit comprises:
   a pressure detection sub-circuit configured to detect a press parameter that is generated by pressing the handwriting input apparatus when the user performs the suspending handwriting input;
   an action determination sub-circuit connected to the pressure detection sub-circuit and configured to determine the input action of the user as an active motion when the press parameter is greater than or equal to a preset threshold value, and to determine the input action of the user as a shift motion when the press parameter is less than the preset threshold value.

3. The apparatus according to claim 2, wherein the action determination sub-circuit is further configured, when the user performs the suspending handwriting input, to determine the input action of the user as an inactive motion, if coordinates of a cursor on a display screen of the display device corresponding to the input action go beyond a display range of the display device, or if the display screen of the display device is served as a handwriting input plane for the suspending handwriting input, and the angle formed by the plane and a normal line of the display screen of the display device is greater than a preset angle.

4. The apparatus according to claim 2, further comprising:
   a reset circuit connected to the communication circuit and configured to reset the cursor on the display screen of the display device.

5. The apparatus according to claim 2, wherein
   when the press parameter is pressure, the preset threshold value is 0.5 Newton; and
   when the press parameter is intensity of pressure, the preset threshold value is 1000 Pascal.

6. The apparatus according to claim 1, wherein
   when the handwriting input apparatus uses the display screen of the display device as the handwriting input plane for the suspending handwriting input, and the input action detection circuit detects that the input action of the user who is performing the suspending handwriting input with the handwriting input apparatus is a click operation, the processing circuit converts the click operation into input information for "one dot";
   the communication circuit transmits the information for "one dot" to the display device via communication, so that a position corresponding to the input information on the display screen of the display device is clicked.

7. The apparatus according to claim 1, wherein
   the action switching circuit is connected to the processing circuit and is configured to switch a motion state and/or an operation type of the handwriting input apparatus.

8. The apparatus according to claim 1, further comprising:
   an input state switching circuit connected to the processing circuit and configured to switch an input state of the handwriting input apparatus when the handwriting input apparatus is in an active motion state.

9. The apparatus according to claim 1, further comprising:
   a force feedback circuit connected to the communication circuit and configured to feed a force back to the user when the communication circuit receives feedback information from the display device.

10. A handwriting pen comprising a casing in which the handwriting input apparatus according to claim 1 is arranged.

11. The handwriting pen according to claim 10, wherein input action detection circuit comprises a pressure detection sub-circuit, a concave region is arranged in the casing and the pressure detection sub-circuit is located in the concave region.

12. A handwriting input method comprising steps of:
    detecting an input action of an user who is performing the suspending handwriting input with a handwriting input apparatus, the suspending handwriting input being configured to perform line inputting and erasing of the existing lines, the line inputting including inputting of characters and graphics;
    converting the input action to input information; and
    transmitting the input information via communication to a display device for receiving and displaying the input information;
    wherein the input action is considered as an inactive motion in a case where an action switching circuit in the handwriting input apparatus has a higher priority and is switched to an inactive motion.

13. The method according to claim 12, wherein the step of detecting the input action of the user who is performing the suspending handwriting input with the handwriting input apparatus comprises:
    detecting a press parameter that is generated by pressing the handwriting input apparatus when the user performs the suspending handwriting input;
    determining the input action as an active motion when the press parameter is greater than or equal to a preset threshold value; and determining the input action as a shift motion when the press parameter is less than the preset threshold value.

14. The method according to claim 13, wherein
    the active motion comprises an action for drawing a line, an action for erasing a line, a clicking action, and a pulling action.

15. The method according to claim 13, wherein,
    when the press parameter is pressure, the preset threshold value is 0.5 Newton; and
    when the press parameter is intensity of pressure, the preset threshold value is 1000 Pascal.

16. The method according to claim 12, wherein the step of detecting the input action of the user who is performing the suspending handwriting input with the handwriting input apparatus further comprises:

determining the input action of the user as an inactive motion if the coordinates of the cursor on the display screen of the display device corresponding to the input action go beyond the display range of the display device, or if the handwriting input apparatus uses the display screen of the display device as a handwriting input plane for the suspending handwriting input, and the angle formed by the plane and the normal line of the display screen of the display device is greater than a preset angle.

17. The method according to claim 12, wherein when the handwriting input apparatus uses the display screen of the display device as a handwriting input plane for the suspending handwriting input, and in the step of detecting the input action of the user who is performing the suspending handwriting input with the handwriting input apparatus, the input action of the user who is performing the suspending handwriting input with the handwriting input apparatus is detected as a click operation, the step of converting the input action into input information comprises:

converting the click operation into input information for "one dot";

the step of transmitting the input information via communication to the display device for receiving and displaying the input information comprises:

transmitting the input information for "one dot" to the display device via communication, so that a position on the display screen of the display device corresponding to the input information is clicked.

18. The method according to claim 12, further comprising one of or any combination of:

switching a motion state and/or an operation type of the handwriting input apparatus;

switching an input state of the handwriting input apparatus when the handwriting input apparatus is in an active motion state;

resetting the cursor on the display screen of the display device; and feeding a force back to the user when feedback information from the display device is received.

\* \* \* \* \*